May 18, 1943.  E. MARTIN  2,319,552
AUXILIARY GOVERNOR CONTROL
Filed Feb. 27, 1941  2 Sheets-Sheet 1
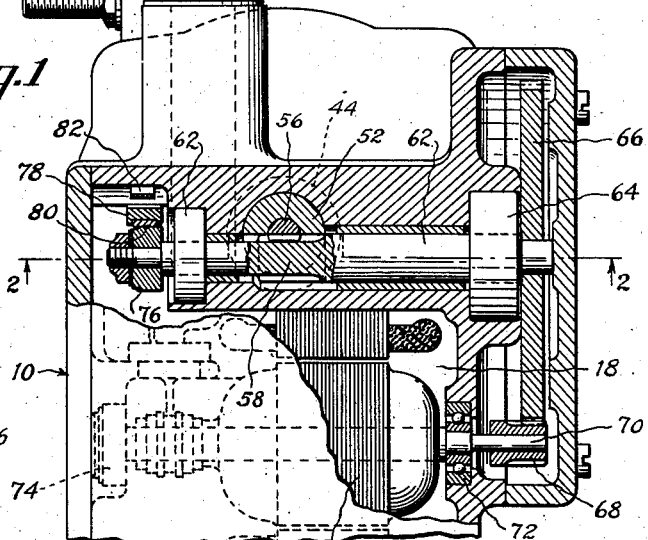
INVENTOR
*Erle Martin*
BY *Harris G. Luther*
ATTORNEY

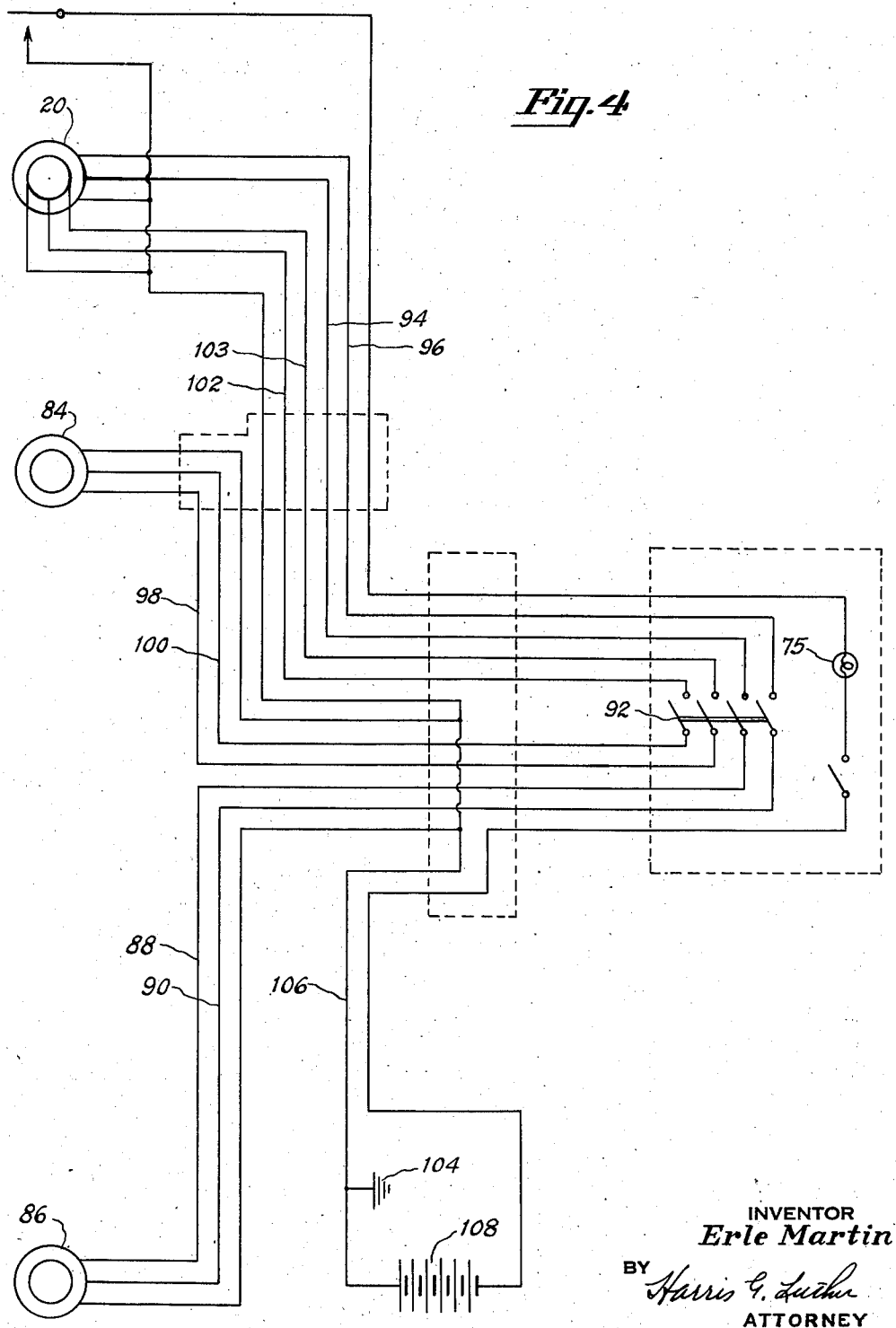

Patented May 18, 1943

2,319,552

UNITED STATES PATENT OFFICE 2,319,552

AUXILIARY GOVERNOR CONTROL

Erle Martin, West Hartford, Conn., assignor to United Aircraft Corporation, East Hartford, Conn., a corporation of Delaware Application February 27, 1941, Serial No. 380,817

12 Claims. (Cl. 60—97)

This invention relates to improvements in speed governing devices and has particular reference to an improved means for obtaining minor adjustments of automatic or synchronizing governors.

An object of the invention resides in the provision, in a speed governor of the character indicated, of means for making major changes in the speed setting of the governor and independent means for making minor changes in the speed setting of such a governor.

A further object resides in the provision in a governor in which the force exerted by centrifugally actuated weights is balanced by spring pressure, of one spring adapted to balance the greater part of the force exerted by said centrifugally actuated weights and a second spring adapted to balance only a small portion of the force exerted by said centrifugally actuated weights, and independent devices for changing the loading on the two springs.

A still further object resides in the provision in a governor of the character indicated of manually controllable means for changing the speed setting of the governor and automatically actuated means for making minor corrections in the speed setting to maintain respective devices controlled by two or more such governors in a condition of substantial speed synchronization.

Other objects and advantages will be more particularly pointed out hereinafter or will become apparent as the description proceeds.

In the accompanying drawings, in which like reference numerals are used to designate similar parts throughout, there is illustrated a suitable mechanical arrangement for the purpose of disclosing the invention. The drawings, however, are for the purpose of illustration only and are not to be taken as limiting or restricting the invention, since it will be apparent to those skilled in the art that various changes in the illustrated construction may be resorted to without in any way exceeding the scope of the invention.

In the drawings, Fig. 1 is a transverse sectional view of a governor constructed according to the invention.

Fig. 2 is a longitudinal sectional view on the line 2—2 of Fig. 1.

Fig. 3 is an elevational view on the line 3—3 of Fig. 2 with the cover plate shown along this line removed, and Fig. 4 is a schematic view of a wiring diagram for a synchronizing system including the improved automatic governor.

Referring to the drawings in detail, the numeral 10 generally indicates a governor casing preferably formed of a plurality of separable parts and including a chamber 12 for the centrifugal weights 14, a chamber 16 for the governor speed setting adjusting mechanism and a chamber 18 for a motor 20 for changing the speed setting of the governor.

The centrifugal weights 14 are mounted upon and driven by a drive shaft 22 which may have a driving connection with an engine upon which the governor is mounted. These weights act through a thrust bearing 24 on a stem 26 which carries a valve plunger 28 which cooperates with ports 30 and 32 in the drive shaft 22 to control a supply of hydraulic fluid under pressure from the pressure line 34 to the pitch changing mechanism 36 of a controllable-pitch propeller 38 or other speed controlling device. The action of the centrifugal weights 14 on the stem 26 is resisted by a coiled compression spring 40 one end of which rests on an abutment 42 secured to the stem 26 and the other end of which bears against a movable abutment 44 adjustable by suitable means, such as the pinion 46 engaging with rack teeth on the abutment 44 and rotatable by a manually rotatable pulley 48. A second spring 50 may be included, disposed between a fixed abutment 52 disposed on the side of the movable abutment 44 opposite the spring 40, and the movable abutment 44. The purpose of this spring 50 is to automatically set the governor at an operative speed setting in case manual control of the adjustment of the abutment 44 should be lost by some structural failure such as breakage of the cable used to rotate the pulley 48.

A third spring 54 is disposed between the abutment end of the stem 26 and a second movable abutment 56 slidable through the movable abutment 44. The spring 54, as particularly shown in Fig. 2, is a very light spring in comparison with the springs 40 and 50 and is designed to exert a force sufficient to change the governor setting only a comparatively few revolutions per minute to produce slight variations of the speed setting of the governor from the setting maintained by the loading of the main speeder spring 40. By thus keeping the forces required to load this spring very small a very light low power motor can be used to move the abutment 56. The abutment 56 is moved by a pinion 58 on a shaft 60 mounted in suitable anti-friction bearings 62 and 64 and carrying at one end thereof a gear 66 which meshes with a smaller gear 68 carried on the end of the shaft 70 of the motor device 20 which shaft is carried in suitable anti-friction bearings 72 and 74 also carried in the governor casing 10.

A switch 73, as particularly illustrated in Fig. 3, may be associated with the shaft 60 and electrically connected with a pilot light 75 particularly shown in Fig. 4. This switch may comprise a ring 76 secured on the end of the shaft 60, a lever 78 of insulating material pivoted to the casing 10 and carrying a contact member 80 in contact with the ring, and a spring 82 resiliently urging the lever 78 towards the ring. The ring has a peripheral surface of insulating material except for a small contact member that makes a current conducting contact with the member 80 when the abutment 56 is at or near its mid-position thus causing the light 75 to be illuminated when the micro-adjusting means is at or near a position midway its governor adjusting range.

The improved governor hereinabove described is particularly adapted for use in synchronizing the speed of several power plants of a multi-engine aircraft. Fig. 4 shows a schematic wiring diagram for a two engine airplane in which a governor adjusting motor is indicated at 20 and two engine driven alternating current generators are indicated at 84 and 86. The alternating current generator 84 is mounted upon and driven by the same engine which supports and drives the governor of which the motor 20 constitutes a part and the alternating current generator 86 is mounted upon and driven by a different engine which is utilized as the master or pace setting engine in the arrangement shown. The engine driving the generator 86 would have a governor provided with a manual speed setting control but would not need a micro-adjustment device. The motor 20 is preferably a form of electromotor device having separately wound and independently energized stator and rotor portions, such a device being known to the art as a "Selsyn motor." The generator 86 is connected through suitable current conducting conduits 88 and 90, a manually operable switch 92, and the conduits 94 and 96 with the stator portion of the motor 20 and the generator 84 is connected through the conduits 98 and 100, the switch 92 and the conduits 102 and 103 with the rotor portion of this motor. One phase winding of each portion of the motor and one phase winding of each generator is connected with ground, as indicated at 104, through a common conduit 106. With this arrangement the speed will be set by the engine driving the generator 86 and impulses determined by the rate of speed of this generator will be applied to the stator portion of the motor 20. The generator 84 will be driven at the speed of the controlled engine and impulses determined by the rate of speed of this generator will be applied to the rotor portion of the motor 20. Whenever the impulses applied by the two generators do not coincide in phase and frequency a rotation of the rotor portion of the motor relative to the stator portion will take place. Such a rotation of the rotor portion of the motor 20 will change the loading on the auxiliary governor spring 54 and bring about a change in the speed of the controlled engine which change in speed will tend to bring the speed of the controlled engine into a state of synchronism with the speed of the master engine. By changing the loading on the auxiliary spring 54 the motor will vary the governor speed setting whenever there is a variation of the speed of the controlled engine from that of the master engine to continuously maintain the controlled engine in a state of speed synchronization with the master engine. The spring 54 is so attached at its end to the end of the plunger 26 and the end of the abutment 56 that it can exert a force in either direction on the plunger depending upon whether the spring is compressed or extended by the movement of the abutment 56. When the abutment 56 is in its central or neutral position it does not exert any material force on the spring 54. This neutral position of the abutment 56 is indicated to the operator of the vehicle by the illumination of the lamp 75 occasioned by the switch 73 completing the circuit through this lamp and the battery 108. The indicating light which is operated by the abutment when in the neutral position is intended to indicate that the micro synchronizer is in its neutral position and that operation is not taking place at or near either end of the synchronizing range or band. When adjusting the manual controls of the micro synchronizer, adjustment is made to the point where the indicating light is illuminated prior to switching on the automatic electric synchronizing feature. If the engines happen to be in exact synchronization at this moment, the light will remain illuminated, and as this is not likely to occur, the synchronizer will move abutment 50 away from the neutral position in one direction or the other, depending upon the relationship between the engine being synchronized, and the speed of the master engine until a point is reached where synchronization takes place. As soon as movement away from the neutral position takes place, the indicating light goes out.

While a suitable mechanical embodiment has been hereinabove described and illustrated in the accompanying drawings for the purpose of disclosing the invention, it is to be understood that the invention is not limited to the particular embodiment so illustrated and described but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a centrifugal speed governor having centrifugal weights operatively associated with a movable control member, two speeder springs acting in parallel on said control member to resist the action of said centrifugal weights thereon, and respective means independent of each other for adjusting the loading on said two speeder springs.

2. In a centrifugal speed governor having a movable control member and centrifugal weights operatively associated with said control member, two speeder springs of different strength acting in parallel on said control member to oppose the action of said centrifugal weights thereon and respective means independent of each other for adjusting the loading on said two speeder springs.

3. In a centrifugal speed governor having a movable control member and centrifugal weights operatively associated with said control member, two speeder springs of different strength acting in parallel on said control member to oppose the action of said centrifugal weights thereon, respective movable abutments for said springs movable independently of each other, and respective means independent of each other for moving said abutments.

4. In a centrifugal speed governor having a movable control member and centrifugal weights operatively associated with said control member, two speeder springs of different strength acting in parallel on said control member to oppose the action of said centrifugal weights thereon, respective movable abutments for said springs movable independently of each other, and respective means independent of each other for moving said abutments, the means for moving the movable abutment for the stronger of said speeder springs being manually operable, and the means for moving the movable abutment for the weaker spring being motor actuated.

5. In a centrifugal speed governor, means for making major adjustments of the speed setting of said governor, and motor operated means of small adjusting capacity for making minor adjustments in the speed setting of said governor.

6. A control for matching the speeds of two rotary power unit having, in combination, variable speed governors each controlling the speed of one of said units, manually operable means for adjusting the speed settings of said governors over the major portions of their operating ranges, electric motor means operable to adjust the speed setting of one of said governors over the remainder of its range, and means responsive to the speeds of both of said units and operable to vary the energization of said motor means and synchronize said units.

7. In a synchronizing control, a governor having a manually adjustable main speeder spring, and an auxiliary speeder spring means having a neutral position and selectively adjustable in both directions from said neutral position to vary its effect on the main spring whereby the speed setting of the governor is determined by the cumulative loading of the two springs.

8. In a synchronizing control, a governor having a coiled speeder spring adjustable to vary the governor speed setting, a second coiled spring means coacting with said first spring to determine the speed setting, and having a neutral position, and means operable selectively to adjust said spring means in both directions from said neutral position to increase or reduce the effect of the spring means.

9. In a synchronizing control, the combination of a governor automatically controlling the speed of a power unit and having rotary flyballs, two coiled springs concentrically arranged and operable cumulatively to counteract the action of said flyballs, one of said springs being maintained under compression, manually operable means for variably loading said last mentioned spring, adjusting mechanism for variably loading the other of said springs, said adjusting mechanism having a neutral position, determined by coaction between said other spring and said adjusting mechanism, in which it is balanced, and means operable automatically to operate said spring adjusting mechanism to vary the degree of stress in said other spring.

10. In a centrifugal speed governor having a movable control member and centrifugal weights operatively associated with said control member, two speeder spring means of different strength acting in parallel on said control member to oppose the action of said centrifugal weights thereon, respective movable abutments for said spring means movable independently of each other, and respective means independent of each other for moving said abutments, and in which the weaker of said spring means has a neutral position in which no force is exerted on the means for moving its abutment and is so arranged that the abutment may be moved in either direction from said neutral position to increase or decrease the spring force opposing the action of said centrifugal weights.

11. In a control for matching the speed of one prime mover against that of a master, the combination of a governor controlling the speed of said first mentioned prime mover and having rotary flyballs, a spring opposing said flyballs and selectively adjustable to determine the speed setting of the governor over the major portion of its operating range, a second spring coacting with said first spring to control the governor speed adjustment over a small fraction of said range, means for adjusting said second spring, said means having a neutral position from which it is adjustable to increase or decrease the opposition to said flyballs, and automatic means acting differentially in response to the speeds of both of said prime movers to move said adjusting means and adjust said second spring and match the speed of said first prime mover against that of the master.

12. A control for matching the speed of one prime mover against that of a master prime mover having, in combination, a governor for said first prime mover, two selectively adjustable spring means coacting cumulatively to determine the speed setting of said governor and exerting widely varying effect, a differentially acting electric motor operable to vary the smaller of said spring effects, and means variably energizing said motor in accordance with speed differences between said prime movers whereby to match the speed of said first prime mover against that of said master, the spring means exerting the smaller spring effect constructed and arranged so that it always tends to return to a neutral position in which it exerts no force on the adjusting motor and from which it may be adjusted to either increase or decrease the cumulative spring effect.

ERLE MARTIN.